(12) United States Patent
Kong et al.

(10) Patent No.: US 11,275,796 B2
(45) Date of Patent: Mar. 15, 2022

(54) DYNAMIC FACETED SEARCH ON A DOCUMENT CORPUS

(71) Applicant: International Business Machines Corporation, Armonk, NY (US)

(72) Inventors: Biying Kong, Yorktown Heights, NY (US); Nidhi Rajshree, San Jose, CA (US); Alfio Massimiliano Gliozzo, New York, NY (US); Nicolas Rodolfo Fauceglia, Yorktown Heights, NY (US); Robert G. Farrell, Yorktown Heights, NY (US); Md Faisal Mahbub Chowdhury, New York, NY (US); Anish Mathur, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/399,030

(22) Filed: Apr. 30, 2019

(65) Prior Publication Data

US 2020/0349203 A1 Nov. 5, 2020

(51) Int. Cl.
*G06F 16/93* (2019.01)
*G06F 16/28* (2019.01)
*G06N 20/00* (2019.01)
*G06F 16/245* (2019.01)

(52) U.S. Cl.
CPC .......... *G06F 16/93* (2019.01); *G06F 16/245* (2019.01); *G06F 16/285* (2019.01); *G06N 20/00* (2019.01)

(58) Field of Classification Search
CPC ...... G06F 16/93; G06F 16/245; G06F 16/285; G06N 20/00
See application file for complete search history.

(56) References Cited

U.S. PATENT DOCUMENTS

| | | | |
|---|---|---|---|
| 7,827,125 B1* | 11/2010 | Rennison | G06F 16/3332 707/733 |
| 9,298,816 B2 | 3/2016 | Dimassimo et al. | |
| 9,710,570 B2 | 7/2017 | Franceschini et al. | |
| 2003/0217335 A1* | 11/2003 | Chung | G06F 16/355 707/999.001 |
| 2005/0149494 A1* | 7/2005 | Lindh | G06F 16/289 707/999.003 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Kannan Shanmugasundaram
(74) *Attorney, Agent, or Firm* — Peter Edwards, Esq.; MGinn I.P. Law Group, PLLC.

(57) ABSTRACT

A query-focused faceted structure generation method, system, and computer program product for generating a query-focused faceted structure from a taxonomy for searching a document collection, including ingesting a document corpus, generating a vector space representation of a query and instances from a taxonomy of the document corpus, and producing a dynamic structure of a relevant facet categories and facet values using a two-vector space representation from the generated vector space representation.

10 Claims, 12 Drawing Sheets

(56) References Cited

U.S. PATENT DOCUMENTS

| | | |
|---|---|---|
| 2009/0099996 A1 | 4/2009 | Stefik et al. |
| 2010/0235313 A1 | 9/2010 | Rea et al. |
| 2016/0012054 A1* | 1/2016 | Franceschini ......... G06F 16/367 707/730 |
| 2016/0078349 A1* | 3/2016 | Byron ................. G06F 16/3329 706/12 |
| 2018/0189857 A1* | 7/2018 | Wu .......................... G06F 40/30 |
| 2018/0232449 A1 | 8/2018 | Bivens et al. |

OTHER PUBLICATIONS

Stefaner, M. et al., "Dynamic Taxonomies and Faceted Search" Theory, Practice and Experience; Series: The Information Retrieve; Series, vol. 25., 2009.

Tunkelang, D, "Faceted Search", A Publication in the Morgan & Claypool Publishers seriss, 2009.

Koren, J. et al. "Personalized Interactive Faceted Search" WWW 2008, Apr. 21-25, 2008.

Anonymously, "Semi-Supervised Classification Using Object Metadata", An IP.com Prior Art Database Technical Disclosure; IP.com No. IPCOM00252345D; IP.com Electronic Publication Date: Jan. 5, 2018.

Anonymously, "Generating Synthetic Keywords Using Natural Keywords for Cross-Repository Search", An IP.com Prior Art Database Technical Disclosure; IP.com No. IPCOM000240936D; IP.com Electronic Publication Date: Mar. 12, 2015.

Zheng, Z. et al, "Method and System of Online Learning for Recency Search Ranking Using Real-Time User Feedback", An IP.com Prior Art Database Technical Disclosure; IP.com No. IPCOM000203007D; IP.com Electronic Publication Date: Jan. 14, 2011.

United States Notice of Allowance dated Jan. 6, 2021, in co-pending U.S. Appl. No. 16/399,180.

* cited by examiner

FIG. 5

Type: product
ibm_websphere_application_server
ibm_db2
notepad

Type: error
blocking
fail
blank_screen

Type: file
updates
fixes
log

Type: process
ftp
crontask
httpd 1

Type: command
trace
click
refresh

Type: server
proxy_server
app_server
blade_server 1

Type: language
java
c
fortran

Type: role
customer
programmer
support_team

Type: hardware
printer
display
mouse

Type: protocol
sftp
ssl
smtp

Type: tool
gzip
compiler
notepad

FIG. 6

Query: db2 migration fail
Target faceted structure: 3 categories, 5 facets per category

DB2 Version 9.5 for Linux, UNIX, and Windows

If you want to migrate to a new DB2® Version 9.5 server, you need to recreate your instances and then restore your DB2 Version 9.1 or DB2 UDB Version 8 databases from a database backup. After restoring the database backup, the RESTORE DATABASE command automatically runs the MIGRATE DATABASE command.

Prerequisites
- Ensure that you have root access on Linux and UNIX operating systems or Local Administrator authority on Windows.
- Ensure that you have SYSADM authority.
- Ensure that you meet the installation requirements for DB2 database products. The requirements for operating systems have changed.
- Review migration recommendations and disk space requirements.
- Perform pre-migration tasks.

Restrictions
- Review the migration restrictions for DB2 servers.

Procedure
To migrate to a new DB2 Version 9.5 server:

1. Perform a full offline database backup of your DB2 Version 9.1 or DB2 UDB Version 8 databases; if you did not perform such backups as indicated in the pre-migration tasks. If you performed full offline database backups recently and you cannot perform another one before migration, you can perform an incremental offline database backup instead.
2. Log on to the new DB2 server as root on Linux and UNIX operating systems or user with Local Administrator authority on Windows operating systems.
3. Install DB2 Version 9.5 on the new DB2 server.
4. Recreate your instances by running the db2icrt command from the DB2 Version 9.5 copy location that you installed in the previous step. If the new DB2 server has similar resources, then restore the database manager configuration parameter values for each instance using the UPDATE DBM CFG command and the values that you saved in the pre-migration tasks.
   In a partitioned database environment, you should configure the database manager configuration parameter values for all instances on all database partition servers.

Facets:

error
    fail
    slow
    hang
    failure
    failures process
    db2iupdt
    db2icrt
    db2iupgrade
    db2ilist
    db2imigr command
    db2start
    db2stop
    db2iupdt
    db2idrop
    db2iupgrade

FIG. 8

Input:
- document corpus:
  * [doc1: "DB2 for z/OS ... error 904"]
  * [doc2: "the db2 universal DB, DB2 Purescale"]
- query terms
  * ["db2", "error 904"]
- taxonomy
  * type: "products", instances: ["Websphere Application Server", "Db2", "IBM Statistics"..]
  * type: "operating systems", instances: ["Windows", "Linux", "Unix"]
  * type: "commands", instances: ["ls", "copy", "remove"]

Output: A dynamic facet structure:
- Products:
  * DB2 for z/OS
    – associated in doc1 with error 904 in Type model.
    – Not in taxonomy
  * DB2 Purescale
    – similar to query term 'db2' using Topic model
    – Not in taxonomy
  * Operating Systems:
    * Linux
    * Windows Commands were filtered out

* Parameters:
  – Shape of dynamic facet structure:
    * M=2 facet categories (default: 7).
    * N=2 facet instances per facet category (default: 5)

DYNAMIC FACETED SEARCH ON A DOCUMENT CORPUS

CROSS REFERENCE TO RELATED APPLICATIONS

The present application is a related application of co-pending U.S. patent application Ser. No. 16/399,180, which is filed concurrently herewith, the entire contents of which are incorporated herein by reference.

BACKGROUND

The present invention relates generally to a query-focused faceted structure generation method, and more particularly, but not by way of limitation, to a system, method, and computer program product for generating a query-focused faceted structure from a taxonomy for searching a document collection.

With an enormous amount of unstructured data available in documents, it is important for customers to rapidly narrow down the search over a large corpus in a structured manner and find relevant information quickly.

The growing amount of data that customers experience requires more efficient and accessible ways to organize and find specialized information using their own terminology.

Faceted search involves augmenting a document retrieval system with a faceted navigation system to allow users to narrow down search results by filtering based on a faceted structure.

Conventional facet generating approaches in this space have drawbacks such as that the documents must be tagged with an existing hierarchy which needs to be consistent, adding overhead in content curation and management and these static facets are not based on the matching documents or query. Using other conventional approaches, large numbers of facets are generated which can be overwhelming to the users and make it difficult to navigate and facets based on standard approaches such as corpus-term frequency may produce facets that are not related to the important information in the query. Also, there is no provision for management of the facets generated without adding/editing the original documents, etc.

SUMMARY

Based on the above, the inventors have identified a need in the art that a better method of generating facets for search is needed.

In an exemplary embodiment, the present invention provides a computer-implemented query-focused faceted structure generation method for generating a query-focused faceted structure from a taxonomy for searching a document collection, the method including ingesting a document corpus, generating a vector space representation of a query and instances from a taxonomy of the document corpus, and producing a dynamic structure of a relevant category and facet using a two-vector space representation from the generated vector space representation.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 5 exemplarily depicts examples of input taxonomy of types and instances according to an embodiment of the present invention;

FIGS. 6-7 exemplarily depict examples of facets and an output according to an embodiment of the present invention;

FIG. 8 exemplarily depicts an input and an output according to an embodiment of the present invention;

DETAILED DESCRIPTION

Figure 1:
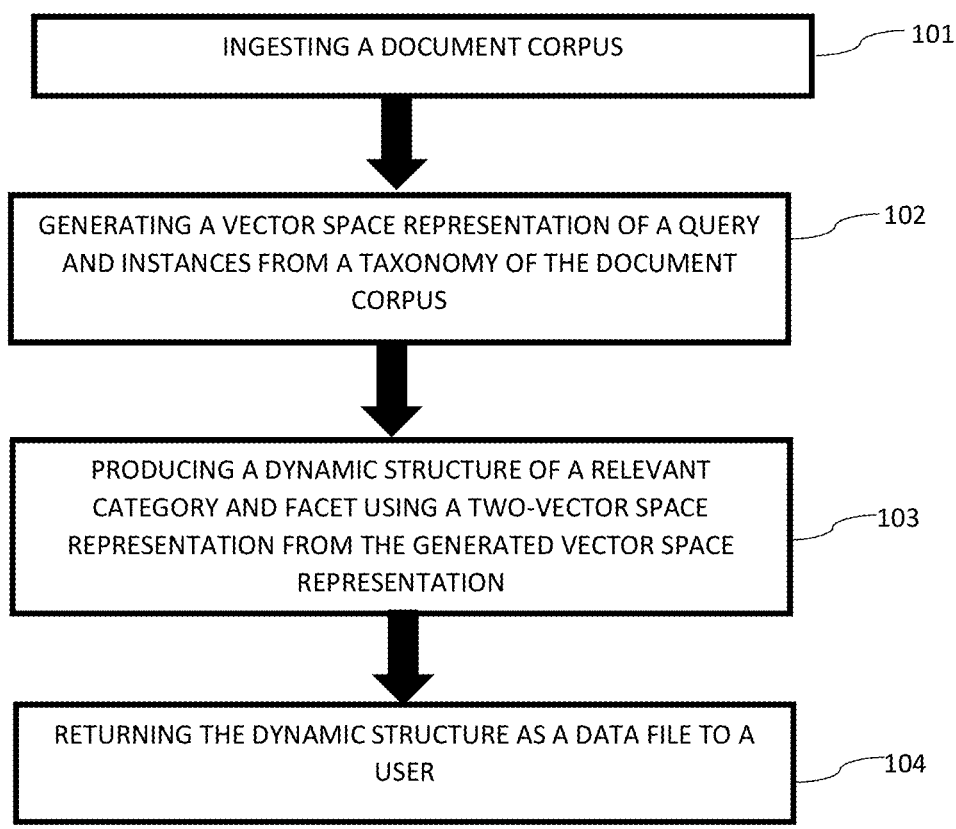
FIG. 1 exemplarily shows a high-level flow chart for a query-focused faceted structure generation method 100 according to an embodiment of the present invention.

The invention will now be described with reference to FIGS. 1-12, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a query-focused faceted structure generation method 100 according to the present invention can include various steps for enhancing robustness of a neural network.

Figure 10:
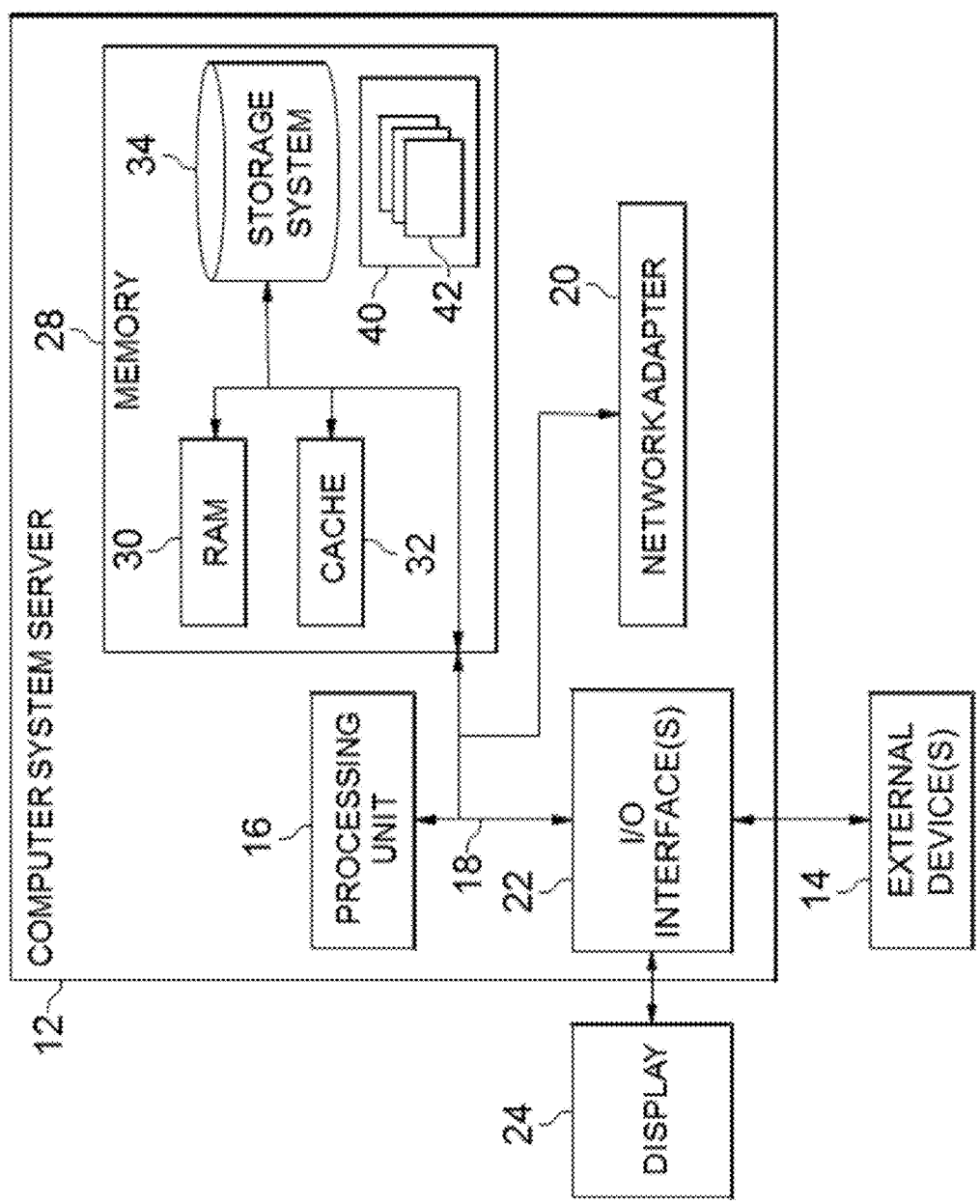
FIG. 10 depicts a cloud-computing node 10 according to an embodiment of the present invention.

By way of introduction of the example depicted in FIG. 10, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 12), it is nonetheless understood that the present invention can be implemented outside of the cloud environment.

Figure 2:
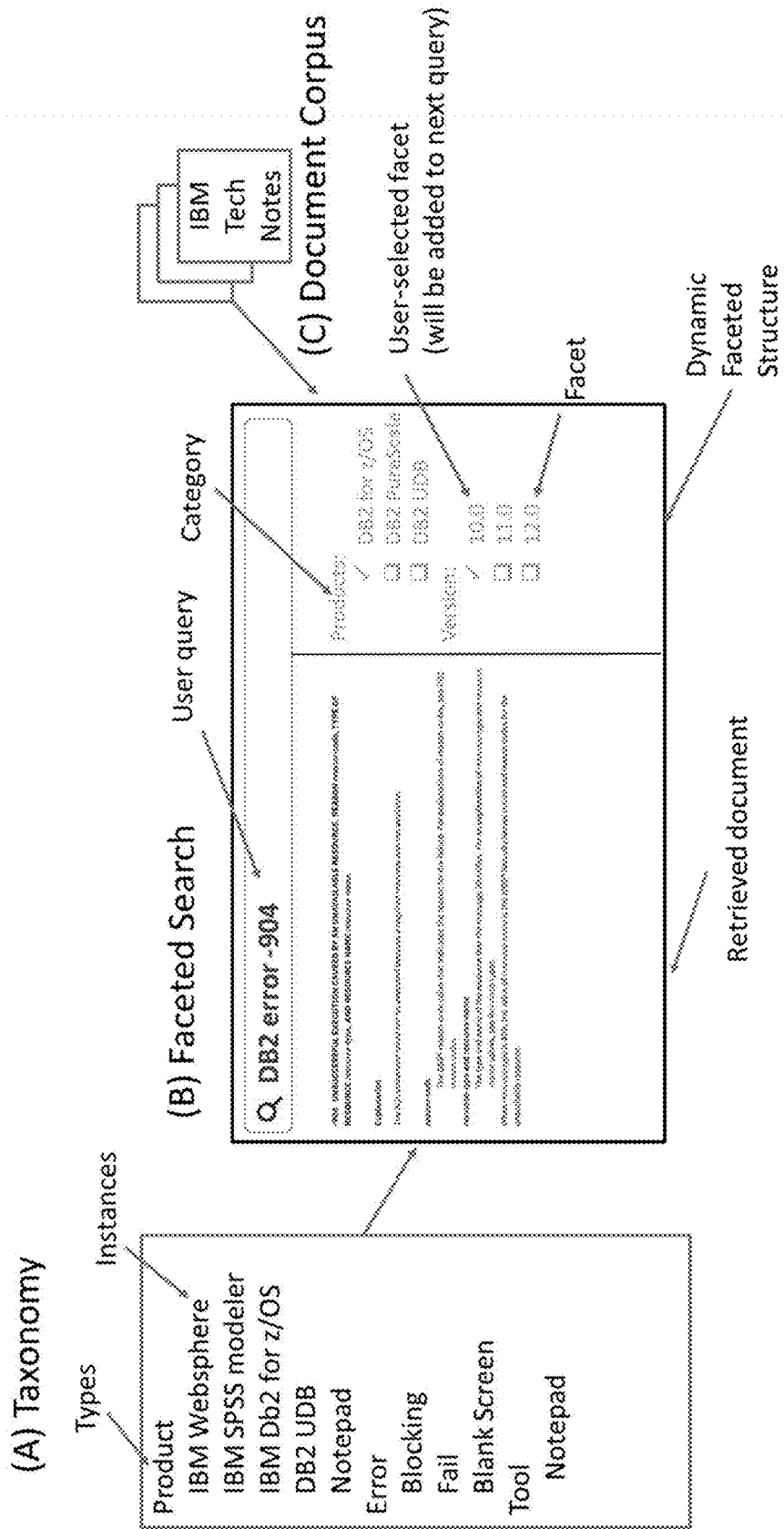
FIG. 2 exemplarily depicts definitions of terms according to an embodiment of the present invention.

Terms used in the descriptions of the steps 101-104 below are exemplarily defined in FIG. 2.

Figure 3:
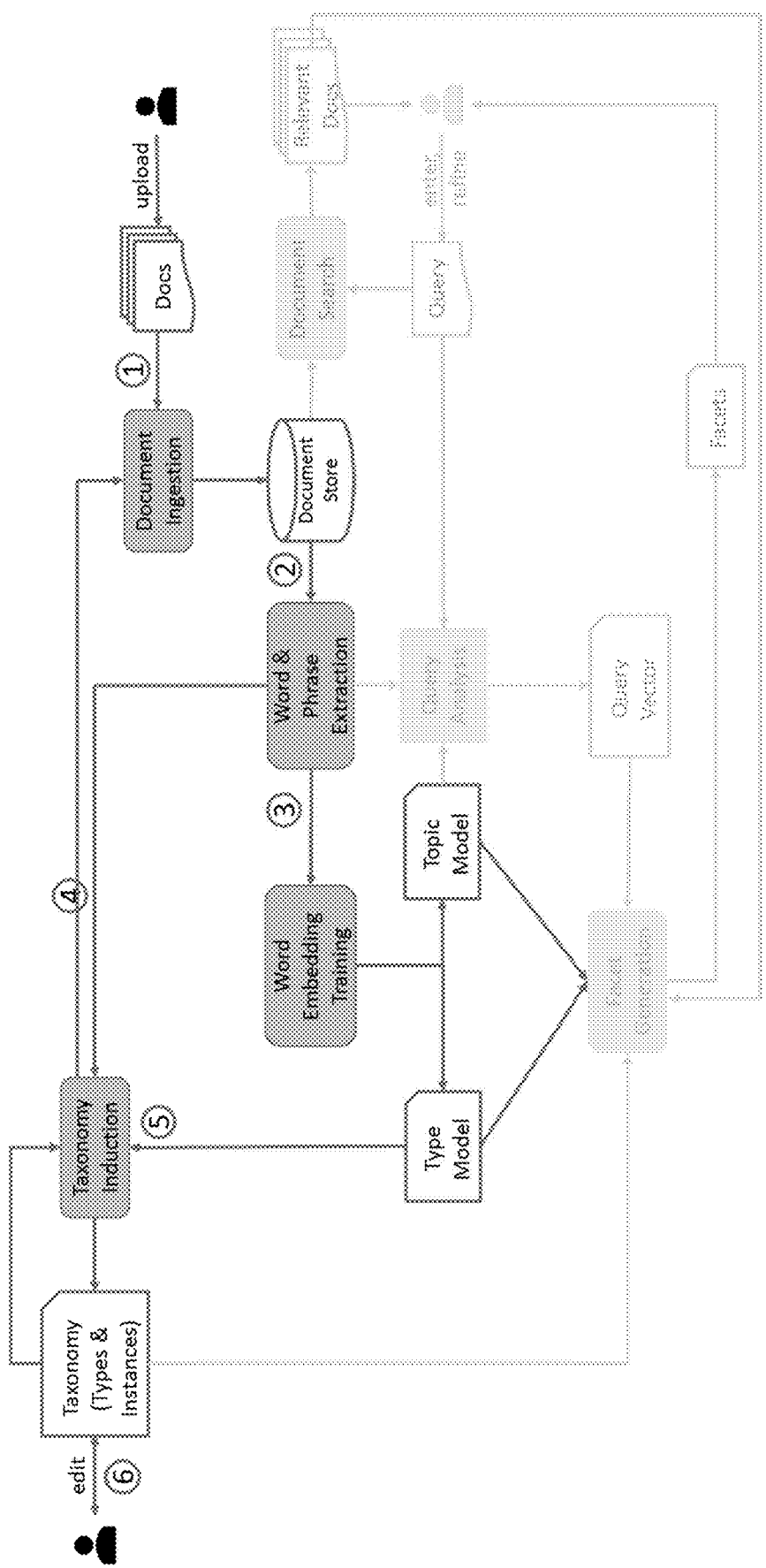
FIGS. 3-4 exemplarily depict a flow chart of the invention according to an embodiment of the present invention.
Figure 4:
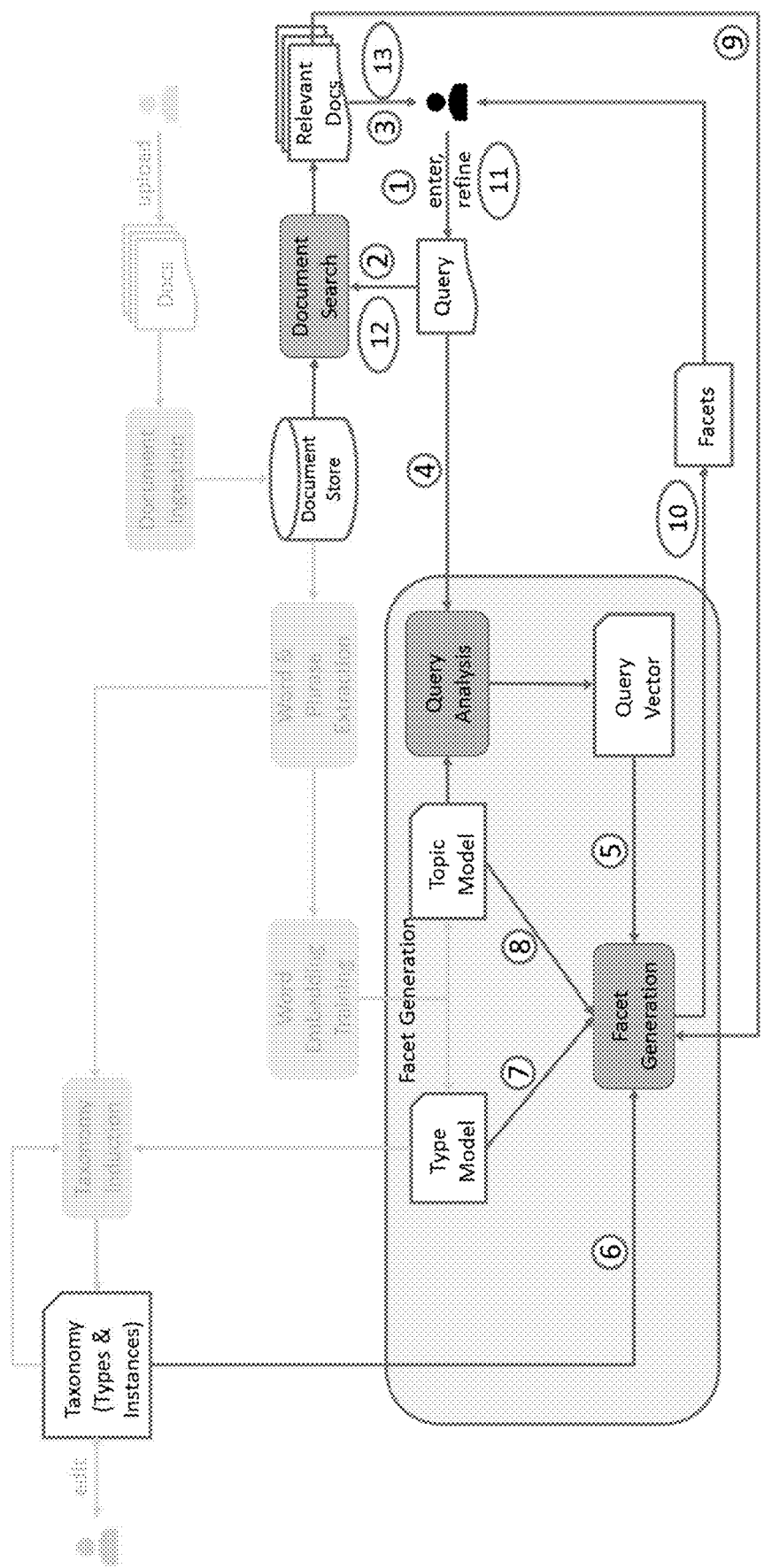

With reference to FIGS. 1 and 3-4, in step 101, a document corpus is ingested. That is, in step 101, a corpus of unstructured/plain text documents is an input and several steps are performed on the corpus. The steps include, a step of pre-processing by splitting the corpus into sentences. Moreover, in this step, chunks are annotated using a shallow syntactic parser. For a second step, candidate hypernym-hyponym pairs are extracted by using unsupervised hypernym induction directly from text such as in co-pending Application IBM Reference No. P201807822. In another step, a taxonomy is built by grouping hyponyms by hypernyms and form hierarchies. In this step a higher accuracy is obtained for domain specific large corpus by splitting the corpus into N dataset. The intuition for this is that domain specific taxonomy should be consistent across different dataset of same domain. These steps are repeated to obtain N set of hypernym-hyponym pairs. Thus, any pair that appears in less than M set (where M<N) are removed and the remaining hyponyms are grouped by hypernyms and form hierarchies.

To enable navigation to related types and entities not in the document corpus, hyponyms are matched against entity types, concepts, or classes in a knowledge graph. Hypemyms can be matched against entities, instances, sub-concepts, or sub-classers in the same knowledge graph using Jaro-winkler distance (approximate string matching, edit distance). WordNet I used as the knowledge graph but others such as Wikidata may also be used. Synonyms for hypernyms are generated from matching entities etc. in the knowledge graph. The intuition behind this is that the knowledge graph supports structured navigation to related information (e.g., Wikipedia® pages for people, places, and things) not contained in the corpus.

It is noted that the Jaro-winkler distance is a string metric measuring an edit distance between two sequences. Other metrics can be used to measure distance between the strings.

In another embodiment, in step 101, noun words and phrases (terminology) are filtered from the shallow parsed chunks. While noun phrases (NP chunks) are extracted, other part of speech patterns are also extracted. The invention uses about 100 patterns that include adjectives, numbers, and so on. Part of speech patterns from titles of encyclopedia articles are run through a part-of-speech tagger and the most frequent patterns are retained, the patterns are then matched against the chunks to extract a sequence of words. A 'type model' is trained that generates a phrase embedding of the terminology in the document corpus (Word2Vec CBOW, narrow context window). Further, a 'topic model' is trained that generates a second phrase embedding of the terminology in the document corpus (Word2Vec skip-gram, large context window). Both Word2Vec models are two-layer neural networks trained to reconstruct the linguistic context of the phrases. Word2Vec takes input plain text from the document corpus and produces a vector space of a large number of dimensions (e.g., 100) with each unique phrase in the corpus being assigned a corresponding vector in the space, Word vectors are positioned in the vector space such that phrases that share context in the corupus are located proximally in the vector space. The window is the size of the context used. CBOW is a particular method for using Word2Vec that uses a continuous bag of words (or in our case, phrases) where order does not matter. SkipGram is another method of using Word2Vec that uses n-grams but with the possibility of skipped words. The taxonomy is exemplarily shown in FIG. 5. And, the type model and topic model are exemplarily shown in FIG. 9.

In step 102, a vector space representation of a query and instances from a taxonomy of the document corpus is generated. To restrict taxonomy induction to domain specific terminology the invention filters any term in the induced taxonomy that is not part of the domain specific terminology extracted by techniques such as in co-pending U.S. Patent Application No. US20180276196A1 incorporated by reference. If the corpus is heterogeneous (i.e., contains documents of multiple sub-domains), terminologies of the underlying sub-domains (in the corpus) are extracted using techniques such as in co-ending U.S. patent application Ser. No. 15/881,521 incorporated by reference.

The three steps above are followed to extract hypernym-hyponym pairs. During these steps, the invention constructs taxonomies for each of the sub-domain by making sure that the terms in a taxonomy for a sub-domain are part of the corresponding extracted terminology of that sub-domain.

Also, in step 102, the vector space representation is performed by word embedding. To perform the word embedding, different embedding models are trained to predict semantic and syntactic similarity of keywords. For example, a type model may be used such as word2vec with CBOW method, narrow context window for modeling functional and syntactic similarity. And, a topic model may be used by using word2vec with skip-gram method, wide context window for modeling topical similarity.

In this technique, nearest neighbors of the embeddings were evaluated to be useful for modeling similar and related keywords. User studies were performed on a full Wikipedia™ dataset to evaluate the quality of similar keywords and related keywords as returned by the models. Both of the models achieved high precision. And, analysis was performed on an IT support dataset to evaluate if the embeddings can support a typical user query in the IT support use case. The models were able to generate meaningful similar and related keywords that guide a user's exploration in different directions.

In another embodiment, in step 102, a taxonomy is loaded that includes a graph of type and instance nodes where instances have a consistent relationship to type. A database structure, XML or OWL file, or other technical means may be used to encode a graph of type and instance nodes.

Figure 7:
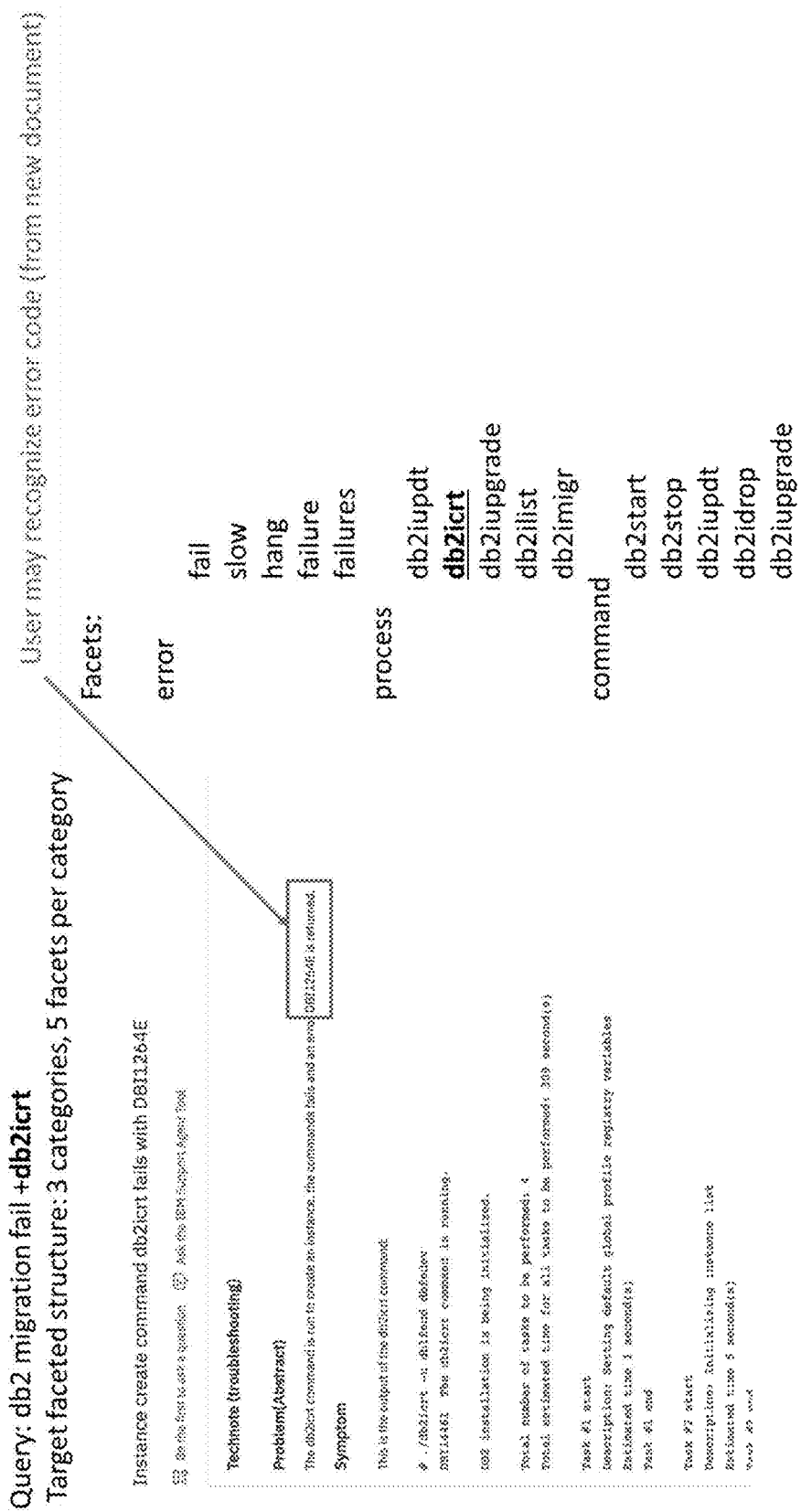
Figure 9:
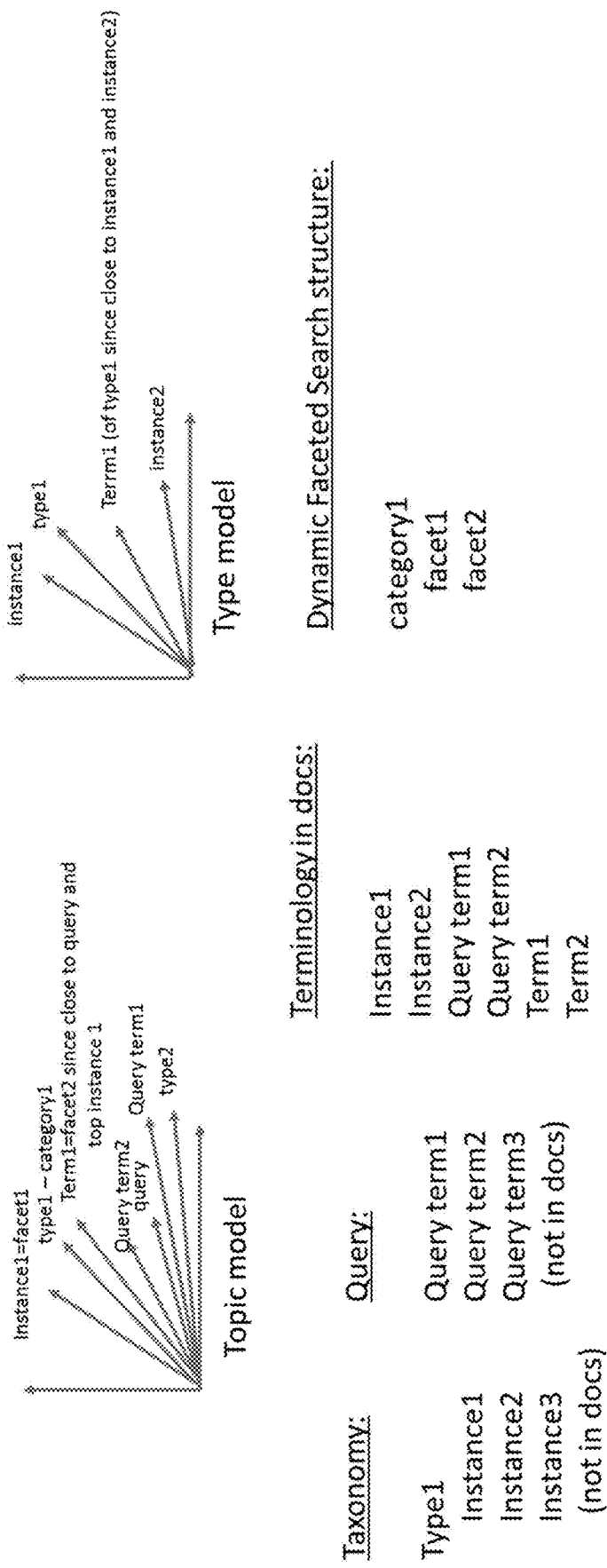
FIG. 9 exemplarily depicts dynamic faceted search trains using two-word embedding models according to an embodiment of the present invention.

In step 103, a dynamic structure of relevant facet categories and facet values is produced using two vector space representations (e.g., as shown in FIGS. 6-7). It is noted that the two models are not combined into one, but they are both used. For facet category generation, the input is a query vector and the output is a list of facet categories. A list of instances in the taxonomy with a cosine similarity in the Topic model closest to the query vector are retrieved as facet values. Then the types in the taxonomy are ordered by the number of matching instances with the highest number first. One issue is that the facet category may not have enough facet values as required by the user. Therefore, for each type, more instances are obtained from the document corpus that are similar to the centroid of instances from taxonomy induction in the Type vector space. These are filtered using terminology from search results (e.g., relevant docs) so that only facet values appearing in the search results are included. Then, the top n facet values are presented for each facet category. The top n facets are determined by sorting by a combination (multiplication) of the cosine distance to the centroid of the instances vectors in the Type vector space and the cosine distance to the query vector in the Topic vector spaceI Using boh scores is designed to make sure that the facet values are relevant to both the facet category and the query.

In step 103, the vector space representation of a user query and instances from a taxonomy is generated, a vector for the user query (e.g., a weighted combination of the vectors for each query token in the topic model) is generated as query vector, and a list of vectors is generated for instances from the taxonomy in the topic model.

That is, in step 103, a dynamic structure of facet categories and facet values is produced using the two vector space representations, the Type vector space and the Topic vector space. To do so, a K (parameter) is selected with nearest neighbor instances to the query vector from taxonomy instances using the Topic Model as query-similar instances, an M (parameter) is selected for types in the taxonomy with the most number of query-similar instances to use as categories, and an N (parameter) facet values is selected from instances of the types corresponding to each of the M facet categories. The N facet values are expanded within each of the M facet categories to get more category-similar instances from the document corpus using the Type model. Thus, some facets may not be in either the query or the taxonomy (discoverable). The facet values are ranked within each of the M categories by distance to both the query vector (e.g., in topic model vector space) and to the centroid of the N instances that correspond to the category (e.g., in type model vector space).

In step 104, the dynamic structure is returned as a data file to a user. The facet values are filtered from the above by the terms from the search result documents, and the facets are kept that appear in the search document results.

FIG. 8 exemplarily depicts an input and the dynamic structure (output) returned as the data file to the user.

That is, steps 101-104 include steps for generating a query-focused faceted structure from a taxonomy for searching a document collection by augmenting taxonomy types with new instances where the instances are entities within a proximity of existing instances of taxonomy types in a local embedding of entities parsed from the document collection, ranking each instance in the augmented taxonomy with respect to its type as a function of both the distance from the instance to the query in a global embedding vector space of the entities trained from the document collection and the distance of the instance to the type in the local embedding, ranking the taxonomy types using their expanded instances in the document collection for each type, and presenting a faceted structure for narrowing a search of the document collection to a user, the faceted structure generated by selecting the ranked taxonomy types as search categories and ranked instances within each type as search facets within each category.

In one embodiment, the taxonomy may be a knowledge graph, a glossary, a hierarchical taxonomy, a DAG taxonomy, an ontology, a database schema, a type system. In another embodiment, the type model is a Word2vec cbow model, with a context window below a threshold, autoencoders and the topic model is a Word2Vec with a context window above a threshold, LSA, PCA.

As noted above, the taxonomy was generated from an interactive processing using the corpus (e.g., spreadsheet patent in references), an automatic process using the corpus (e.g., hypernym induction in references) where the automatic process merges taxonomies generated from different sub-collection of the document collection.

In another embodiment, the distance metric may be a cosine-similarity, a Pearson, a Minkowski, a Euclidian, etc.

And, in one embodiment, the faceted structures includes elements (types, entities) not generated from the document collection where the types in the knowledge graph are retrieved using lexical synonyms from multi-word types and where the instances in the knowledge graph are retrieved using approximate string matching.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 20, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 10, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 11:
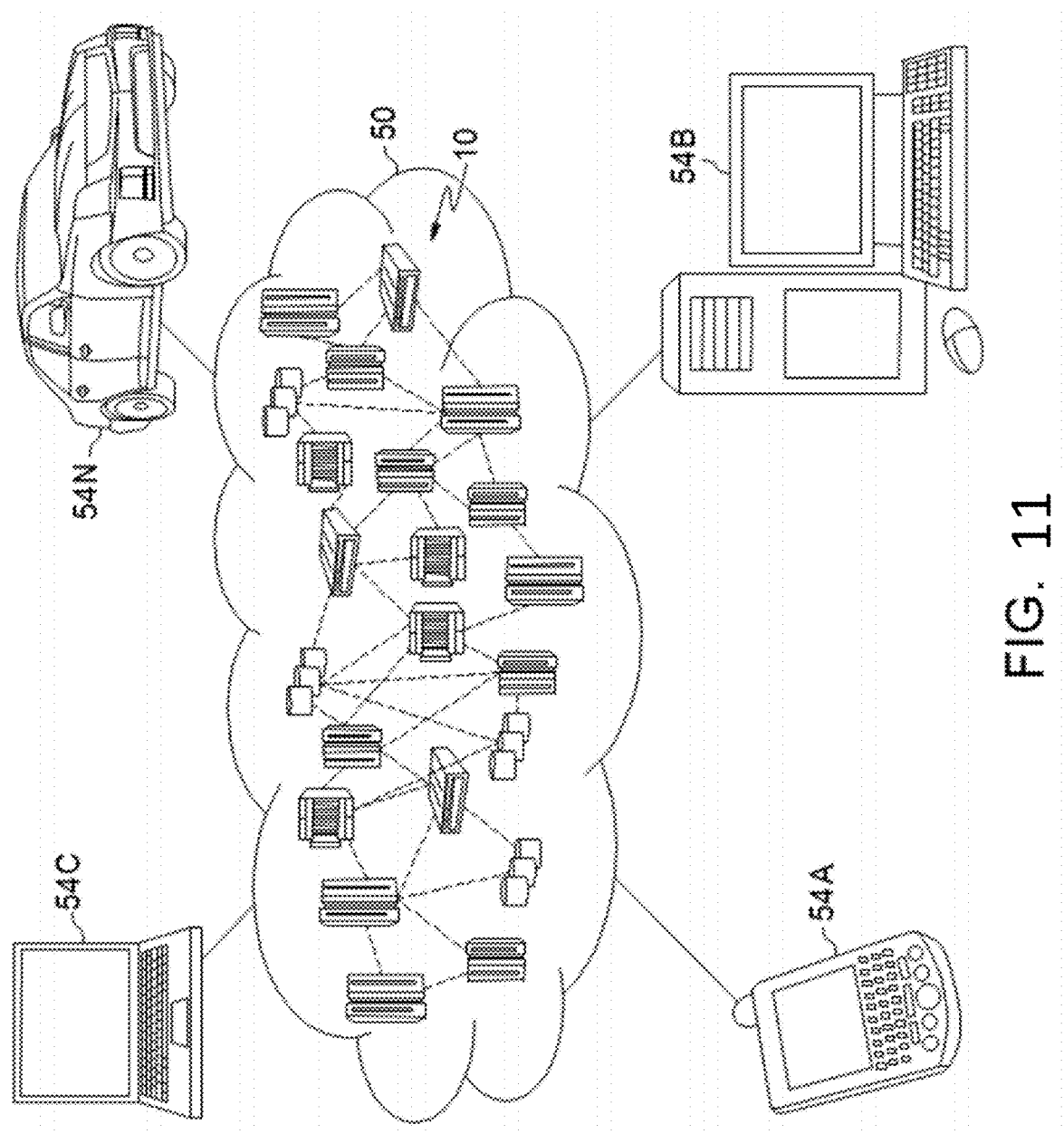
FIG. 11 depicts a cloud-computing environment 50 according to an embodiment of the present invention.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Figure 12:
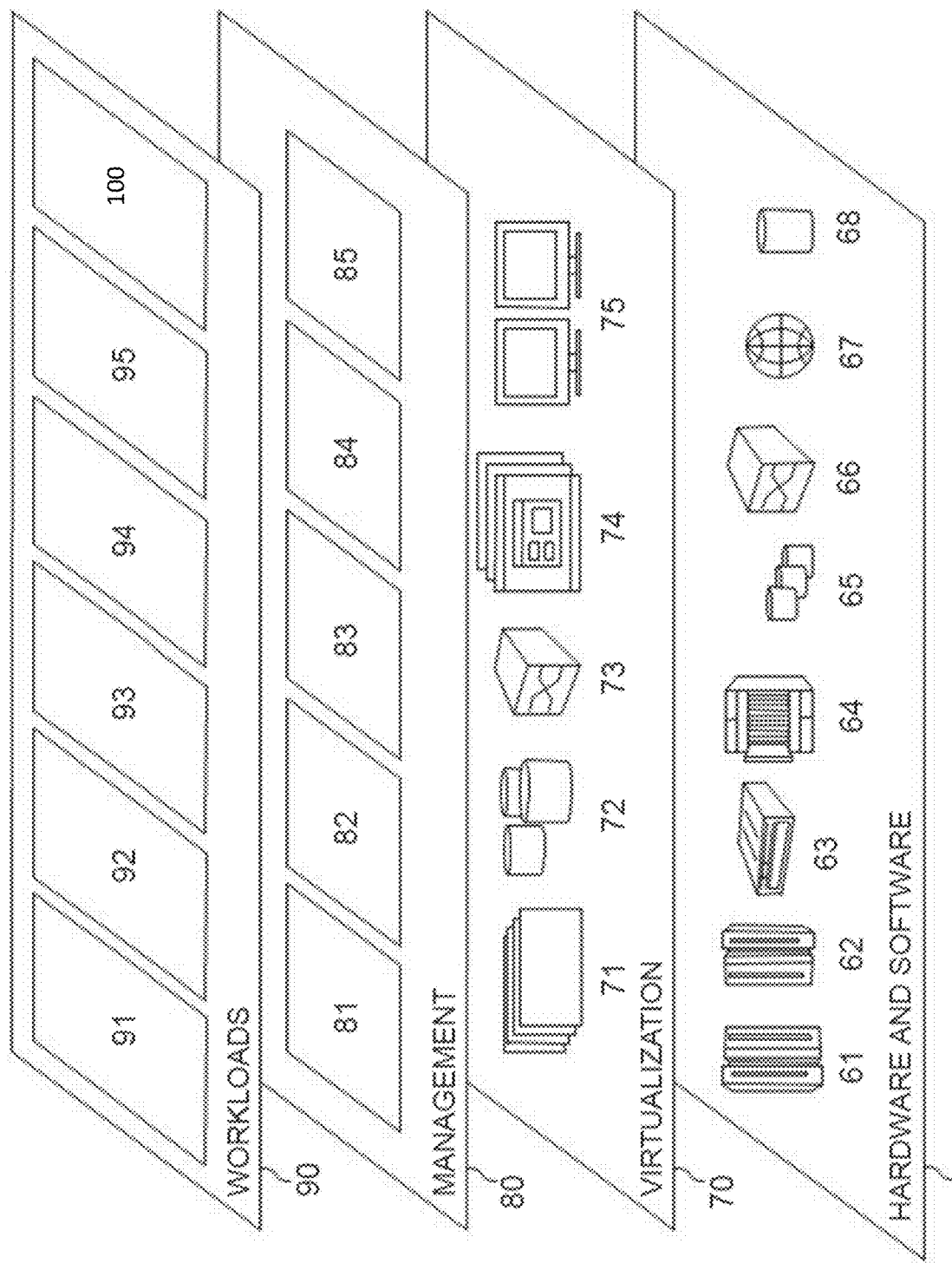
FIG. 12 depicts abstraction model layers according to an embodiment of the present invention.

Referring now to FIG. 12, an exemplary set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query-focused faceted structure generation method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented query-focused faceted structure generation method for generating a query-focused faceted structure from a taxonomy for searching a document collection, the method comprising:
   ingesting a document corpus including a pre-processing that filters parts of speech;
   generating a vector space representation of a query and instances from a taxonomy of the document corpus via at least two models, the taxonomy being loaded and including a graph of a type and instance nodes where the instance nodes have a consistent relationship to the type; and
   producing a dynamic structure of a relevant category and facet using a two-vector space representation from the generated vector space representation based on a separate two-vector space representation of the at least two models,
   wherein the ingesting ingests the document corpus by:
      extracting the terminology that includes noun words and phrases from the document corpus to:
         train a type model that generates a phrase embedding of the terminology in the document corpus; and
         train a topic model that generates a second phrase embedding of the terminology in the document corpus,
   wherein the generating generates a vector for a user query as a weighted combination of the vector for each query token in the topic model as a query vector,
   wherein the generating generates a list of the vectors for instances from the taxonomy in the topic model, and
   wherein the producing produces the dynamic structure of the relevant category and the facet by:
      selecting a first parameter of nearest neighbor instances to the query vector from the taxonomy instances using the topic model as query-similar instances;

selecting a second parameter of types in the taxonomy with a most number of query-similar instances to use as categories;

selecting a third parameter of facets from instances of the types corresponding to each of the categories for the second parameter; and expanding from the third parameter of the facets within each of the second parameter of the categories to obtain more category-similar instances from the document corpus using the type model.

2. The method of claim 1, further comprising returning the dynamic structure as a data file to a user.

3. The method of claim 1, wherein the facets are ranked within each of the first parameter of the categories by distance to both:

the query vector in the topic model vector space, and a centroid of the third parameter of instances that correspond to the category.

4. The method of claim 1, embodied in a cloud-computing environment.

5. A computer program product for query-focused faceted structure generation, the computer program product comprising a computer-readable storage medium having program instructions embodied therewith for generating a query-focused faceted structure from a taxonomy for searching a document collection, the program instructions executable by a computer to cause the computer to perform:

ingesting a document corpus including a pre-processing that filters parts of speech;

generating a vector space representation of a query and instances from a taxonomy of the document corpus via at least two models, the taxonomy being loaded and including a graph of a type and instance nodes where the instance nodes have a consistent relationship to the type; and producing a dynamic structure of a relevant category and facet using a two-vector space representation from the generated vector space representation based on a separate two-vector space representation of the at least two models, wherein the ingesting ingests the document corpus by:

extracting the terminology that includes noun words and phrases from the document corpus to:

train a type model that generates a phrase embedding of the terminology in the document corpus; and train a topic model that generates a second phrase embedding of the terminology in the document corpus, wherein the generating generates a vector for a user query as a weighted combination of the vector for each query token in the topic model as a query vector, wherein the generating generates a list of the vectors for instances from the taxonomy in the topic model, and wherein the producing produces the dynamic structure of the relevant category and the facet by:

selecting a first parameter of nearest neighbor instances to the query vector from the taxonomy instances using the topic model as query-similar instances;

selecting a second parameter of types in the taxonomy with a most number of query-similar instances to use as categories;

selecting a third parameter of facets from instances of the types corresponding to each of the categories for the second parameter; and expanding from the third parameter of the facets within each of the second parameter of the categories to obtain more category-similar instances from the document corpus using the type model.

6. The computer program product of claim 5, further comprising returning the dynamic structure as a data file to a user.

7. The computer program product of claim 5, wherein the facets are ranked within each of the first parameter of the categories by distance to both:

the query vector in the topic model vector space, and a centroid of the third parameter of instances that correspond to the category.

8. A query-focused faceted structure generation system for generating a query-focused faceted structure from a taxonomy for searching a document collection, the system comprising:

a processor; and a memory, the memory storing instructions to cause the processor to perform:

ingesting a document corpus including a pre-processing that filters parts of speech;

generating a vector space representation of a query and instances from a taxonomy of the document corpus via at least two models, the taxonomy being loaded and including a graph of a type and instance nodes where the instance nodes have a consistent relationship to the type; and producing a dynamic structure of a relevant category and facet using a two-vector space representation from the generated vector space representation based on a separate two-vector space representation of the at least two models, wherein the ingesting ingests the document corpus by:

extracting the terminology that includes noun words and phrases from the document corpus to:

train a type model that generates a phrase embedding of the terminology in the document corpus; and train a topic model that generates a second phrase embedding of the terminology in the document corpus, wherein the generating generates a vector for a user query as a weighted combination of the vector for each query token in the topic model as a query vector, wherein the generating generates a list of the vectors for instances from the taxonomy in the topic model, and wherein the producing produces the dynamic structure of the relevant category and the facet by:

selecting a first parameter of nearest neighbor instances to the query vector from the taxonomy instances using the topic model as query-similar instances;

selecting a second parameter of types in the taxonomy with a most number of query-similar instances to use as categories;

selecting a third parameter of facets from instances of the types corresponding to each of the categories for the second parameter; and expanding from the third parameter of the facets within each of the second parameter of the categories to obtain more category-similar instances from the document corpus using the type model.

9. The system of claim 8, further comprising returning the dynamic structure as a data file to a user.

10. The system of claim 8, embodied in a cloud-computing environment.

* * * * *